(12) United States Patent
Wang et al.

(10) Patent No.: US 7,848,094 B2
(45) Date of Patent: Dec. 7, 2010

(54) ELECTRONIC DEVICE

(75) Inventors: He-Li Wang, Shenzhen (CN); Hong Li, Shenzhen (CN); Ting Zhang, Shenzhen (CN); Ting-Ting Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 180 days.

(21) Appl. No.: 12/195,391

(22) Filed: Aug. 20, 2008

(65) Prior Publication Data

US 2009/0147467 A1 Jun. 11, 2009

(30) Foreign Application Priority Data

Dec. 7, 2007 (CN) .......................... 2007 1 0202938

(51) Int. Cl.
*G06F 1/16* (2006.01)
(52) U.S. Cl. .......................... 361/679.28; 361/679.27; 16/223; 439/165
(58) Field of Classification Search ............ 361/679.27, 361/679.28
See application file for complete search history.

(56) References Cited

U.S. PATENT DOCUMENTS

| | | | | |
|---|---|---|---|---|
| 2,955,271 | A * | 10/1960 | Dawkins | 439/164 |
| 5,043,846 | A * | 8/1991 | Kinoshita | 361/679.09 |
| 5,168,429 | A * | 12/1992 | Hosoi | 361/679.09 |
| 5,214,574 | A * | 5/1993 | Chang | 361/679.09 |
| 5,357,652 | A | 10/1994 | Yamada | |
| 5,390,075 | A * | 2/1995 | English et al. | 361/679.28 |
| 5,608,604 | A * | 3/1997 | Francis | 361/679.28 |
| 5,951,312 | A * | 9/1999 | Horng | 439/165 |
| 6,125,029 | A * | 9/2000 | Sasaki et al. | 361/679.28 |
| 6,128,184 | A | 10/2000 | Ito et al. | |
| 6,262,824 | B1 * | 7/2001 | Sasaki et al. | 398/115 |
| 6,488,517 | B1 * | 12/2002 | Williams et al. | 439/165 |
| 6,564,429 | B2 * | 5/2003 | Bovio et al. | 16/382 |
| 7,137,173 | B2 * | 11/2006 | Sipple | 16/223 |
| 7,669,289 | B2 * | 3/2010 | Shih et al. | 16/367 |
| 2007/0146978 | A1* | 6/2007 | Nakatani et al. | 361/681 |
| 2008/0102907 | A1* | 5/2008 | Komine | 455/575.3 |

FOREIGN PATENT DOCUMENTS

CN 1664746 A 9/2005

* cited by examiner

*Primary Examiner*—Jayprakash N Gandhi
*Assistant Examiner*—Anthony Q Edwards
(74) *Attorney, Agent, or Firm*—Frank R. Niranjan

(57) ABSTRACT

An electronic device includes a main body, a lid body, a hinge, a notch, and a cable. The main body includes a connecting side where the lid body is pivotally mounted to the main body. The hinge is disposed on the connecting side for mounting the lid body to the main body, and includes a fixing frame mounted to one of the main body and the lid body and a pivot member mounted to the other of the main body and the lid body. The notch is defined on one side of the pivot member. The cable extends along the notch and transmits electrical signals between the main body and the lid body.

18 Claims, 3 Drawing Sheets

ELECTRONIC DEVICE

BACKGROUND

1. Field of the Invention

The present disclosure generally relates to electronic devices, and more particularly to a portable electronic device.

2. Description of Related Art

Commonly, a portable electronic device, such as a notebook computer or a portable digital versatile disk (DVD) player, includes a lid body, a main body, a hinge pivotally connecting the lid body to the main body, and a signal line for transmitting signals between the lid body and the main body. The main body may include a center processor for processing requests of users and acquiring results corresponding to the requests. The lid body may include a displaying apparatus for displaying the processing results to the users.

The hinge is disposed at connecting sides of the main body and the lid body. To accommodate, and make room, for the signal line, the hinge may be mounted on only one end, such as left end or right end of the connecting sides. As such, the signal line can be received at the other end of the connecting sides. As a result, the connecting area between the lid body and the main body where the signal line is received may be unstable. The signal line may be twisted and even breaks as the lid body opens or closes with respect to the main body.

Therefore, an improved electronic device is needed to address the aforementioned deficiencies and inadequacies.

SUMMARY

Accordingly, an electronic device is provided. The electronic device includes a main body, a lid body, a hinge, a notch, and a cable. The main body includes a connecting side where the lid body is pivotally mounted to the main body. The hinge is disposed on the connecting side for mounting the lid body to the main body, and includes a fixing frame mounted to one of the main body and the lid body and a pivot member mounted to the other of the main body and the lid body. The notch is defined on one side of the pivot member. The cable extends along the notch and transmits electrical signals between the main body and the lid body.

Other advantages and novel features of the present disclosure will become more apparent from the following detailed description of embodiment when taken in conjunction with the accompanying drawings, in which:

DETAILED DESCRIPTION OF THE EXEMPLARY EMBODIMENTS

Figure 1:
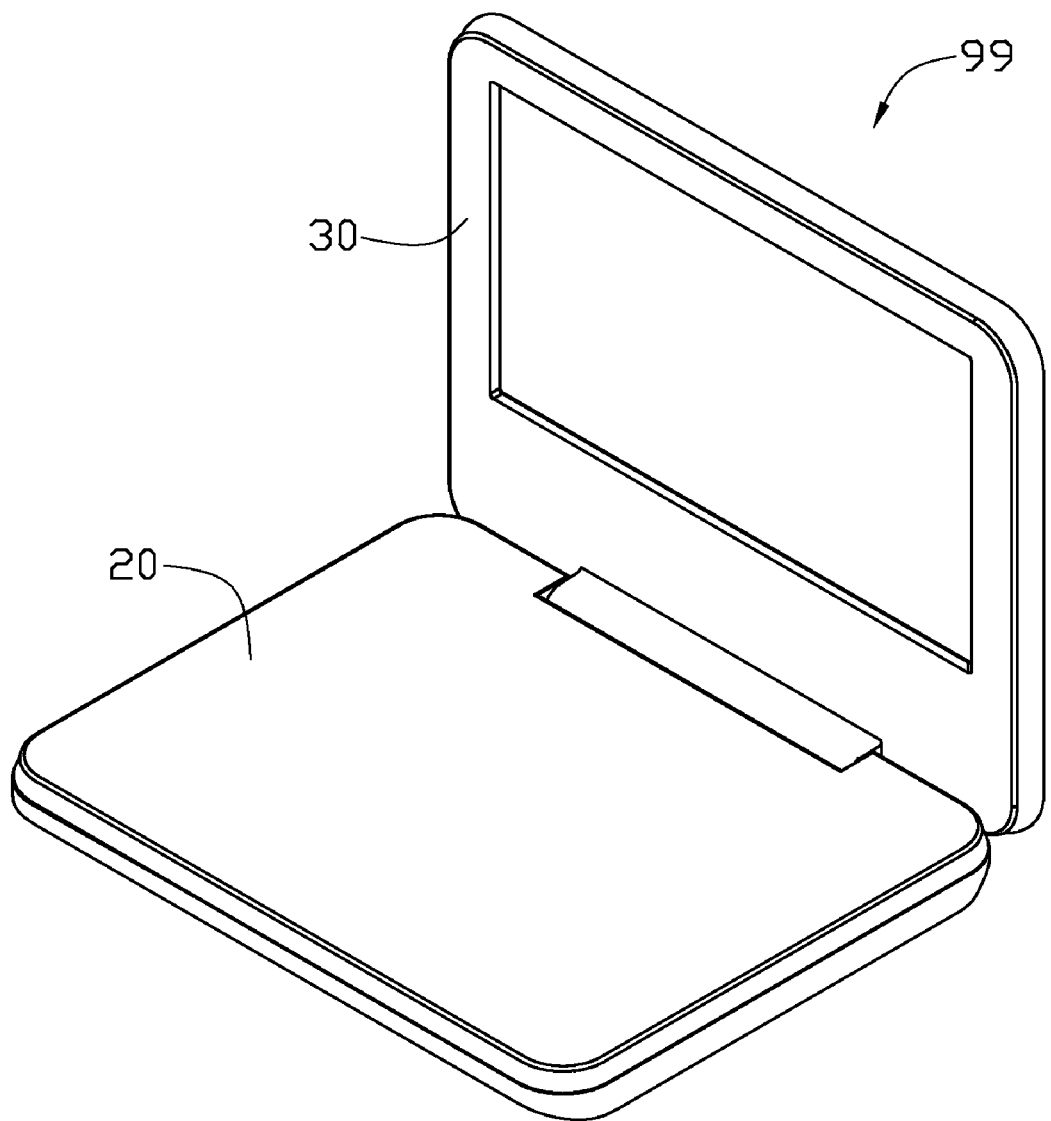
FIG. 1 is an isometric view showing an electronic device in accordance with an exemplary embodiment.
Figure 2:
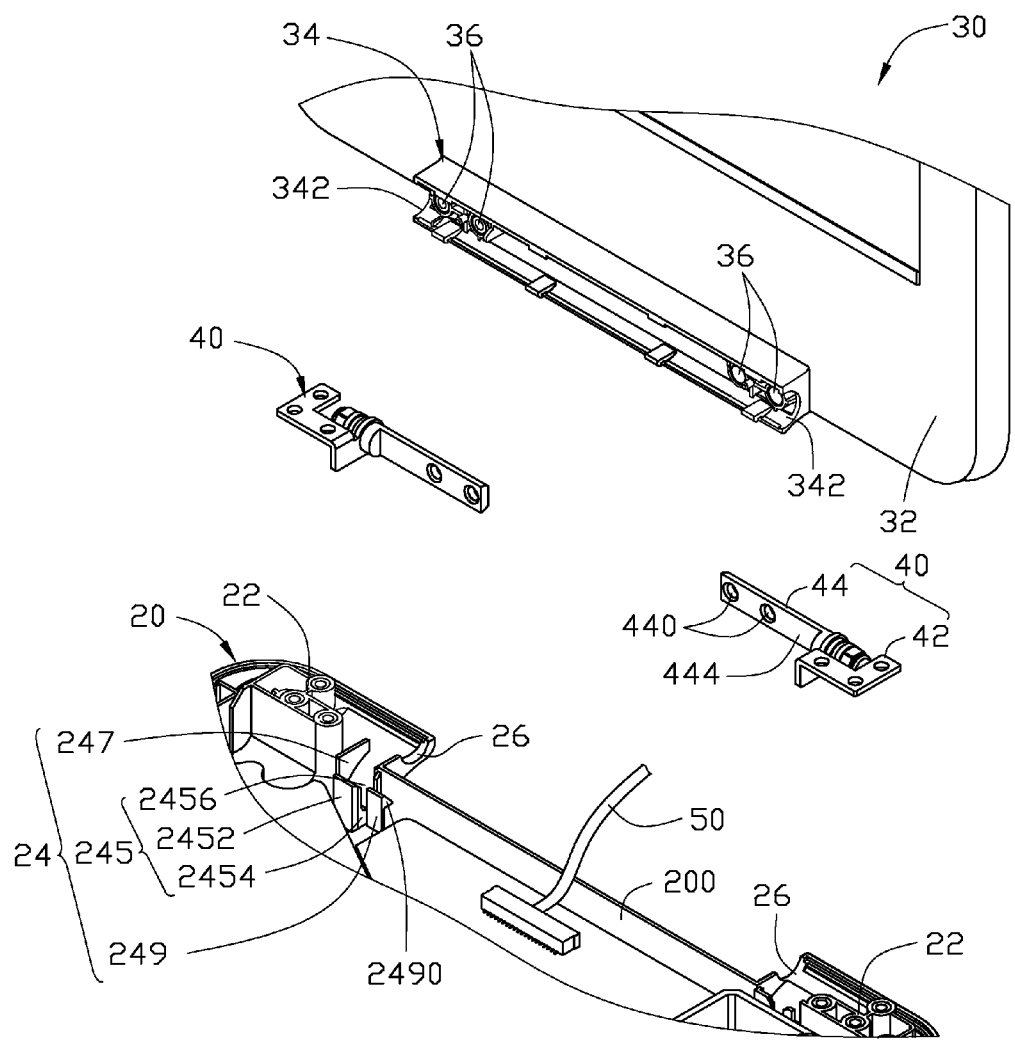
FIG. 2 is a partially exploded view of the electronic device in FIG. 1.
Figure 3:
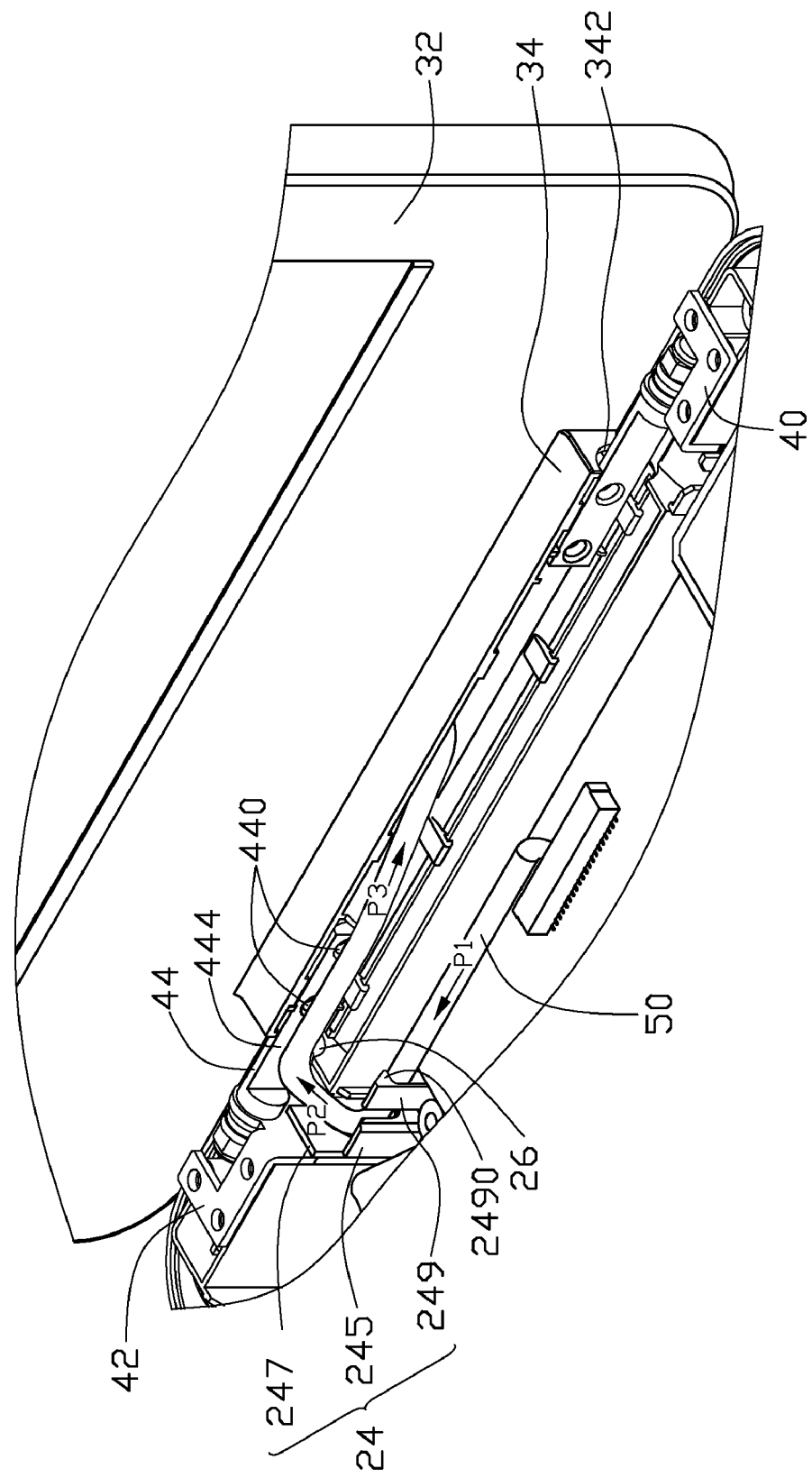
FIG. 3 is a partially assembled view of the electronic device in FIG. 1.

Referring to FIGS. 1 to 3, an electronic device 99 includes a main body 20, a lid body 30, a pair of hinges 40, and a cable 50. The main body 20 includes a connecting side 200 such as a rear side where the lid body 30 is pivotally mounted to the main body 20 by the hinges 40. The pair of hinges 40 are respectively disposed on two ends of the connecting side 200 correspondingly. The cable 50 is used for transmitting electrical signals between the main body 20 and the lid body 30.

The main body 20 has two first mounting members 22 and a second mounting members 24 at the connecting edge 200. Each of the two first mounting members 22 is formed in the main body 20 at each end of the connecting side 200 for allowing the two hinges 40 to be fastened to the main body 20. Each mounting member 22 has three screw posts (not labeled).

The second mounting member 24 is used for the cable 50 to be mounted to the main body 20. The mounting member 24 includes several blocks so as to define a course for allowing the cable 50 therealong. In FIG. 2, at least three blocks are formed in the main body 20.

The first block 245 includes a first baffle 2452 and a second baffle 2454 disposed between the connecting side 200 and the first baffle 2452. The second baffle 2454 defines a U-shaped cutout 2456 for allowing the cable 50 to extend therethrough so as to define a first cable path P1 of the course.

The second block 247 is substantially parallel to the second baffle 2454 and disposed between the first baffle 2452 and the connecting side 200. The second block 247 defines a second cable path P2 of the course substantially perpendicular to the first cable path P1 of the course. The cable 50 substantially abuts the second block 247.

The third block 249, substantially parallel to the first baffle 2452, includes a protrusion 2490 at the upper end thereof for keeping or holding the cable 50 in position.

The main body 20 defines two first openings 26 at the connecting side 200 for allowing the cable 50 to move in and out the main body 20.

The lid body 30 includes a panel 32, an accommodating portion 34 and two fastening members 36 projecting substantially perpendicularly to the panel 32.

The accommodating portion 34 is disposed on the panel 32 and near the connecting side 200 of the main body 20. The accommodating portion 34 defines a pair of second openings 342 at two ends for allowing the cable 50 move in and out the lid body 30.

The two fastening members 36 are disposed in the accommodating portion 34 adjacent to the two second openings 342 correspondingly. Each fastening member 36 includes two screw posts (not labeled).

Each hinge 40 includes a fixing frame 42 and a pivot member 44 that pivotally rotates relative to the fixing frame 42. In the exemplary embodiment, it is illustrated that the fixing frame 42 is mounted to the main body 20 and the pivot member 44 is mounted to the lid body 30. However, the fixing frame 42 can mounted to the main body 20 or the lid body 30. Likewise, the pivot member 44 can be mounted to the main body 20 or the lid body 30.

The two fixing frames 42 can be mounted to the two first mounting members 22 correspondingly by traditional fastening means. In one embodiment, each fixing frame 42 has three mounting holes (not labeled) corresponding to the three screw posts of the first mounting member 22. Three screws (not shown) are extended through the three mounting holes of the fixing frame 42 and engaged with the three screw posts of the first mounting member 22 correspondingly to secure the fixing frame 42 to the mounting member 22.

Each of the two pivot members 44 extend through each one of the pair of second openings 342 and are received in the accommodating portion 34. Each of the two pivot members 44 can be mounted to each one of the two fastening members 36 by conventional fastening means. In one embodiment, the pivot member 44 has two mounting holes 440 corresponding to the two screw posts of the fastening member 36. Two screws (not shown) are extended through the two mounting holes 440 correspondingly and engage with the fastening member 36 to secure the pivot member 44 to the fastening member 36.

The pivot member 44 defines a notch 444 on one side thereof so as to define a third cable path P3. The third cable path P3 is substantially in a direction opposite to the first cable path P1. The cable 50 runs along the third cable path P3 and allows the cable 50 to be threaded through an opening in the middle of the accommodating portion 34 and a corresponding opening in the panel 32. Thus the cable 50 can electrically connects the main body 20 to the lid body 30. The pivot member 44 is substantial flat and the cable 50 abuts the notch 444.

During assembly, the third block 249 is pressed and deformed so that the cable 50 can be held or kept under the protrusion 2490. The cable 50 is then extended through the cutout 2456 of the second baffle 2454 along the first cable path P1. Afterwards, the cable 50 extends along the second cable path P2 and substantially abuts the second block 247. Finally, the cable 50 extends along the first opening 26 and the notch 444 in the third cable path P3, thus, electrically connecting the main body 20 and the lid body 30.

In assembly, the cable 50 extends along the notch 444 and substantially abuts the pivot member 44, thus, twisting of the cable 50 is kept minimal when the lid body 30 opens or closes with respect to the main body 20. Therefore, the probability that the cable 50 breaks due to twisting decreases. In addition, because the two hinges 40 respectively disposed on the two ends of the connecting side 200 pivotally mounts the lid body 30 to the main body 20, the lid body 30 minimally deviates from the main body 20 when the lid body 30 opens or closes relative to the main body 20. Thus, the probability that the cable 50 will break is further decreased.

It is to be understood, however, that even though numerous information and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device comprising:
   a lid body;
   a main body comprising a connecting side where the lid body is pivotally mounted to the main body;
   a hinge disposed on the connecting side for mounting the lid body to the main body and comprising a fixing frame mounted to the main body or the lid body, and a pivot member mounted to the main body or the lid body;
   a notch defined on one side of the pivot member; and
   a cable extending along the notch abutting a substantial flat portion of the pivot member; and transmitting electrical signals between the main body and the lid body.

2. The electronic device according to claim 1, wherein the main body has a mounting member at the connecting side for mounting the cable thereto and defining a course to allow the cable therealong.

3. The electronic device according to claim 2, wherein the course extends along more than one path.

4. The electronic device according to claim 3, wherein the mounting member comprises a first block with a cutout for the cable extending through so as to define a first cable path of the course.

5. The electronic device according to claim 4, wherein the mounting member comprises a second block, the second block defines a second cable path, of the course, substantially perpendicular to the first cable path.

6. The electronic device according to claim 2, wherein the mounting member comprises a third block with a protrusion at the upper end thereof.

7. The electronic device according to claim 1, wherein the electronic device further comprises another hinge, the two hinges are respectively disposed on the two ends of the connecting side.

8. An electronic device comprising:
   a lid body;
   a main body comprising a connecting side where the lid body is pivotally mounted to the main body;
   a pair of hinges disposed on the connecting side for mounting the lid body to the main body, each hinge comprising a fixing frame mounted to one of the main body and the lid body, and a pivot member mounted to the other of the main body and the lid body; and
   a cable received in a notch between the pair of hinges and abutting a substantial flat portion of one pivot member and transmitting electrical signals between the main body and the lid body.

9. The electronic device according to claim 8, wherein the pivot member defines a notch on one side thereby forming a substantial flat surface and the cable is alongside and abuts the notch.

10. The electronic device according to claim 8, wherein the main body has a mounting member at the connecting side for mounting the cable thereto and defining a course to allow the cable there along.

11. The electronic device according to claim 10, wherein the course extends along more than one path.

12. The electronic device according to claim 11, wherein the mounting member comprises a first block with a cutout for the cable extending through so as to define a first cable path of the course.

13. The electronic device according to claim 12, wherein the mounting member comprises a second block, the second block defines a second cable path, of the course, substantially perpendicular to the first cable path.

14. The electronic device according to claim 10, wherein the mounting member comprises a third block with a protrusion at the upper end thereof.

15. The electronic device according to claim 8, wherein the two hinges are respectively disposed on the two ends of the connecting side.

16. An electronic device comprising:
   a lid body;
   a main body comprising a first block and a second block;
   at least one hinge mounted between the lid body and the main body for allowing the lid body to rotate relative to the main body; and
   a cable partially received in the main body for providing digital connection between the main body and the lid body, the cable sequentially extending along a first path and abutting against the first block, and extending along a second path substantially perpendicular to the first path and abutting against the second block, the hinge comprises a pivot member capable of being mounted to one of either the lid body or the main body, the pivot member defines an opening for a portion of the cable extending along a third path substantially opposite to the first path and abutting a substantial flat portion of a pivot member.

17. The electronic device of claim 16, wherein the cable received in the main body is substantially L-shaped.

18. The electronic device of claim 16, wherein the first block defines a cutout for fittingly receiving a portion of the cable that extends along the first path.

* * * * *